United States Patent [19]

Regling

[11] 4,244,984
[45] Jan. 13, 1981

[54] DECOLORIZATION OF PINK GRAPEFRUIT JUICE

[75] Inventor: Siegfried Regling, Raynham, Mass.

[73] Assignee: Ocean Spray Cranberries, Inc., Middleborough, Mass.

[21] Appl. No.: 32,094

[22] Filed: Apr. 20, 1979

[51] Int. Cl.$^3$ ............................................. A23L 2/30
[52] U.S. Cl. ................................. 426/599; 210/917; 426/423
[58] Field of Search ............ 210/24, 40, 65, 75, 210/406; 426/253–256, 423, 442, 599, 616

[56] References Cited

U.S. PATENT DOCUMENTS

| | | | |
|---|---|---|---|
| 2,016,584 | 10/1935 | Ash et al. | 426/423 |
| 2,823,126 | 2/1958 | Little | 426/423 |
| 3,227,562 | 1/1966 | Houghtaling et al. | 426/599 |
| 3,400,884 | 9/1968 | Hundenborn et al. | 210/406 |
| 3,725,083 | 4/1973 | Barron et al. | 426/250 |

OTHER PUBLICATIONS

Zelenskaya et al., Konservnaya I Ovoshchesnshil'naya Promyshlennost' (1977), No. 4, pp. 17–18.
Sugar y Azucar (1972), vol. 67, pp. 11, 12, 14, 44 and 45.

*Primary Examiner*—Ivars C. Cintins

[57] ABSTRACT

Pink grapefruit juice or concentrate is decolorized by vacuum filtration through a bed of coarse diatomaceous earth particles at a pressure differential from 10 to 25 inches of mercury and at a flow rate from 0.1 to 0.5 gal/min/ft.sq. to form a product suitable for beverage use or for blending with white grapefruit juice for beverage use.

3 Claims, No Drawings

DECOLORIZATION OF PINK GRAPEFRUIT JUICE

This invention relates to the decolorization of pink grapefruit juice or pink grapefruit juice concentrate with minimal change in organoleptic properties of the juice and pertains more specifically to the removal of color bodies by vacuum filtration of the juice through a bed of coarse diatomaceous earth particles, at least 80% of which by weight have a particle size above 10 micrometers and all of which have a particle size less than 250 micrometers, while operating the filter bed in partially choked condition.

Although pink and red grapefruit are widely grown and marketed in the form of fresh fruit, the fruit has relatively low value for production of grapefruit juice marketed as such because the color bodies present in the juice tend to discolor and become brown with age and/or with heat sterilization. For these reasons, it is necessary to remove some or all of the color bodies present in pink grapefruit juice while at the same time avoiding excessive loss of turbidity or of pulp particles which impart opalescence to the juice as well as avoiding excessive changes in other organoleptic properties such as viscosity, acidity, sugar content, etc. in order to enable such grapefruit juice to be marketed either in pure form or, as is preferred, in the form of blends with white grapefruit juice. It has been proposed by Zelenskaya et al., Konservnaya I Ovoshchesnshil'naya Promyshlennost' (1977) No. 4, pages 17–18 to employ Russian kieselguhr to reduce the color of apple juice, but U.S. kieselguhr was said to be ineffective. It has also been taught in an anonymous article appearing in Sugar y Azucar (1972), Vol. 67, pages 11–12, 14, 44 and 45 that the color of sugar beets can be controlled by pressure filtration using diatomaceous earth. In the past, the decolorization of pink or red grapefruit juice has been carried out commercially by centrifugation as described, for example, in Barron et al. U.S. Pat. No. 3,725,083. However, centrifugal separation of the color bodies is time-consuming, expensive, and usually requires several passes of the juice through the centrifuge to achieve satisfactory results.

It has now been found that adequate decolorization of pink or red grapefruit juice without excessive loss of turbidity or pulp particles and without excessive impairment of organoleptic properties can be achieved by a single pass vacuum filtration of the juice through a bed of coarse diatomaceous earth particles in which at least 80% by weight have a particle size above 10 micrometers, preferably at least 35% by weight have a particle size from 10 to 40 micrometers, the bed being operated in partially choked condition, i.e., at a pressure differential across the bed of 10 to 25 inches of mercury, preferably 15 to 18 inches of mercury, and a flow rate of 0.1 to 0.5 gal/min/ft.sq. The process accomplishes simultaneous removal of both red and yellow color bodies from pink or red grapefruit juice, resulting in a decrease in citrus redness of 3 to 25 units and a decrease in citrus yellowness of 1 to 10 units as measured on a Hunter colorimeter, Model D-45 Citrus Colorimeter (Hunter, Food Technology, Vol. 21, pages 100–105 (1967)), a color measurement generally accepted as standard in the industry. At the same time, the turbidity of the juice is decreased by only 10 to 15 USDA units, corresponding to removal of 50% to 90% by weight of the total pulp present in the juice before vacuum filtration; and the viscosity and other organoleptic properties of the juice are only minimally affected. The process of the present invention makes it possible to produce commercially acceptable blends of white grapefruit juice containing up to 25% or more by weight of decolorized pink or red grapefruit juice.

The process of the present invention can be used with the juice from any of the usual varieties of pink and red grapefruit such as Ruby Red, Thompson-pink, Ruby, Burgundy, Star Ruby, Marsh pink, Foster pink, as well as sports and strains of such varieties.

The grapefruit juice to which the process of the present invention is applied is desirably first screened in conventional manner to remove coarse pulp; the screened juice can then be subjected to the method of the present invention, or if desired it can first be subjected to conventional centrifugation to remove much of the solids, so that the remaining insoluble material amounts to less than 10% of the total juice by weight, before being subjected to the method of the present invention.

The vacuum filtration can be carried out on a vacuum precoat filter of the conventional cloth-covered rotating drum type on which there is preformed a filter bed approximately 3 to 6 inches thick consisting of coarse diatomaceous earth having the particle size characteristics set forth above; commercially available grades of diatomaceous earth sold under the trade names Celite 545, Celite 560, and Dicalite 5000 have been found to be satisfactory. The filter is preferably operated with the drum having at least ⅓ of its filtering surface submerged in the feed juice at all times in order to achieve optimum flow rates although lesser immersion can be used at lower total flow rates through the drum. In the case of a drum three feet in diameter, satisfactory results are obtained with the drum revolving at a speed in the range of 1.0 to 2.0 minutes per revolution and at a pressure differential from one side of the filter bed to the other of 10 to 25 inches of mercury, preferably 15 to 18 inches of mercury, and a flow rate through the filter bed of 0.1 to 0.5 gal/min/sq.ft., preferably 0.25 to 0.27 gal/min/sq.ft.

In order to maintain the effectiveness of the filter bed for a continuous filtration and keep it from being blinded by the accumulation of retained solids, a doctor blade is provided to remove at each revolution of the drum from 0.005 to 0.020 inch, preferably 0.008 to 0.012 inch, of the outer or upstream face of the filter bed. This step effectively renders the filtration process continuous until the filter bed is shaved down to a minimum effective thickness of about one-half inch.

There follow typical results obtained using as a feed pink grapefruit juices having approximately 10% Brix, a pulp content of 7–9% by weight, and operating under the conditions set forth above, CR representing citrus redness units and CY representing citrus yellowness units as measured on a Hunter colorimeter.

| Example | 1 | | 2 | | 3 | | 4 | | 5 | |
|---|---|---|---|---|---|---|---|---|---|---|
| Color Units | CR | CY | CR | CY | CR | CY | CR | CY | CR | CY |
| Before | 32.7 | 51.3 | 86.2 | 61.2 | 90.4 | 62.8 | 42.8 | 50.3 | 41.3 | 49.8 |

-continued

| Example | 1 | | 2 | | 3 | | 4 | | 5 | |
|---|---|---|---|---|---|---|---|---|---|---|
| Color Units | CR | CY | CR | CY | CR | CY | CR | CY | CR | CY |
| After | 22.1 | 42.9 | 64.5 | 58.1 | 80.6 | 60.7 | 35.0 | 46.0 | 29.8 | 40.5 |

Surprisingly the extent of decrease in color units is approximately the same regardless of the color intensity of the feed juice supplied, while the decrease in turbidity (total pulp content) is maintained at 50% to 90% of that of the feed juice, usually from 50% to 75%, resulting in the decolorized juice product containing up to 6% of total pulp by weight. The resulting decolorized grapefruit juice can be blended with white grapefruit juice to form a mix containing up to 25% or even 50% or more by weight of decolorized juice and which has a medium grade A (18 score) color and is commercially equivalent to white grapefruit juice in viscosity and other organoleptic properties.

What is claimed is:

1. A method of decolorizing pink grapefruit juice or concentrate which comprises preparing a vacuum filtration bed of coarse particulate diatomaceous earth of which at least 80% by weight has a particle size above 10 micrometers, and subjecting to vacuum filtration at a pressure differential from 10 to 25 inches of mercury and at a flow rate from 0.1 to 0.5 gal/min/ft.sq. through said bed a pink grapefruit juice or concentrate to form a product having its citrus redness decreased by 10-25 units and its citrus yellowness decreased by 1-10 units as measured on a Hunter citrus colorimeter and having its total pulp content decreased by 50 to 90% by weight.

2. A method as claimed in claim 1 in which at least 35% by weight of said diatomaceous earth has a particle size from 10 to 40 micrometers.

3. A method as claimed in claim 1 or 2 which method comprises the additional step of blending the product with white grapefruit juice to form a mixture containing up to 50% by weight of said product.

* * * * *